March 27, 1928.
T. B. HART
GLASS FURNACE
Filed Nov. 6, 1925
1,663,839
9 Sheets-Sheet 1
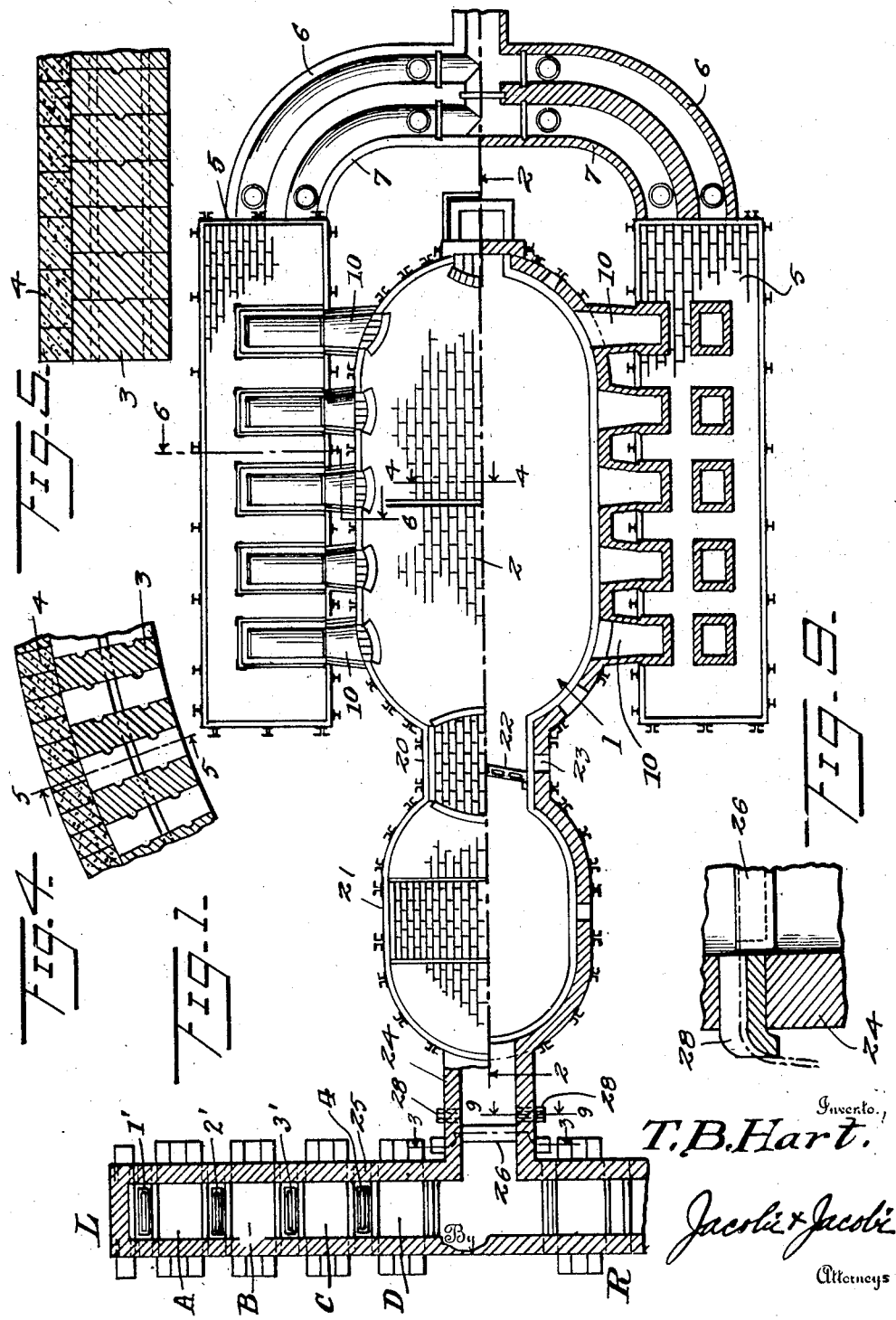

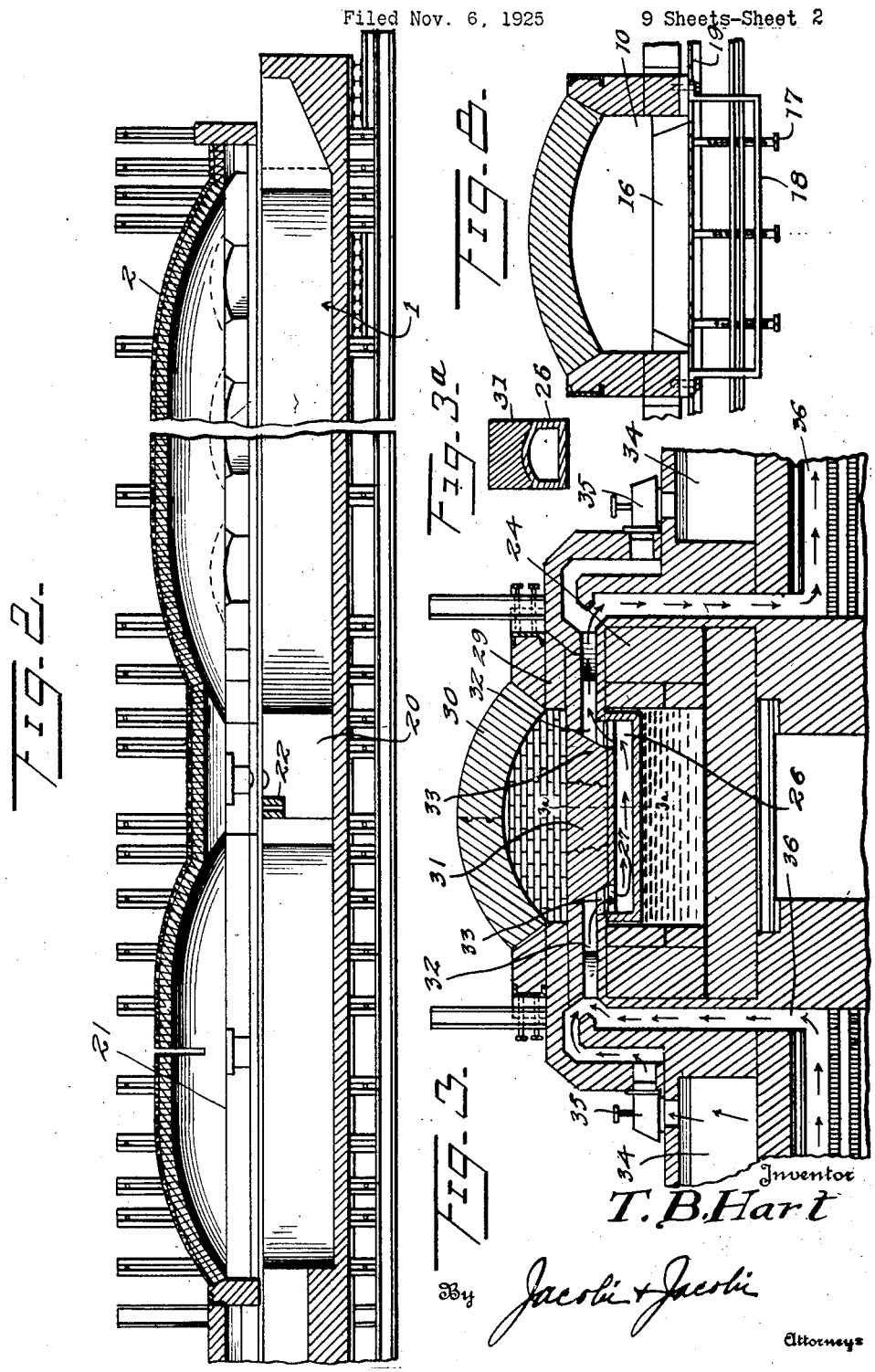

March 27, 1928.
T. B. HART
GLASS FURNACE
Filed Nov. 6, 1925
1,663,839
9 Sheets-Sheet 3
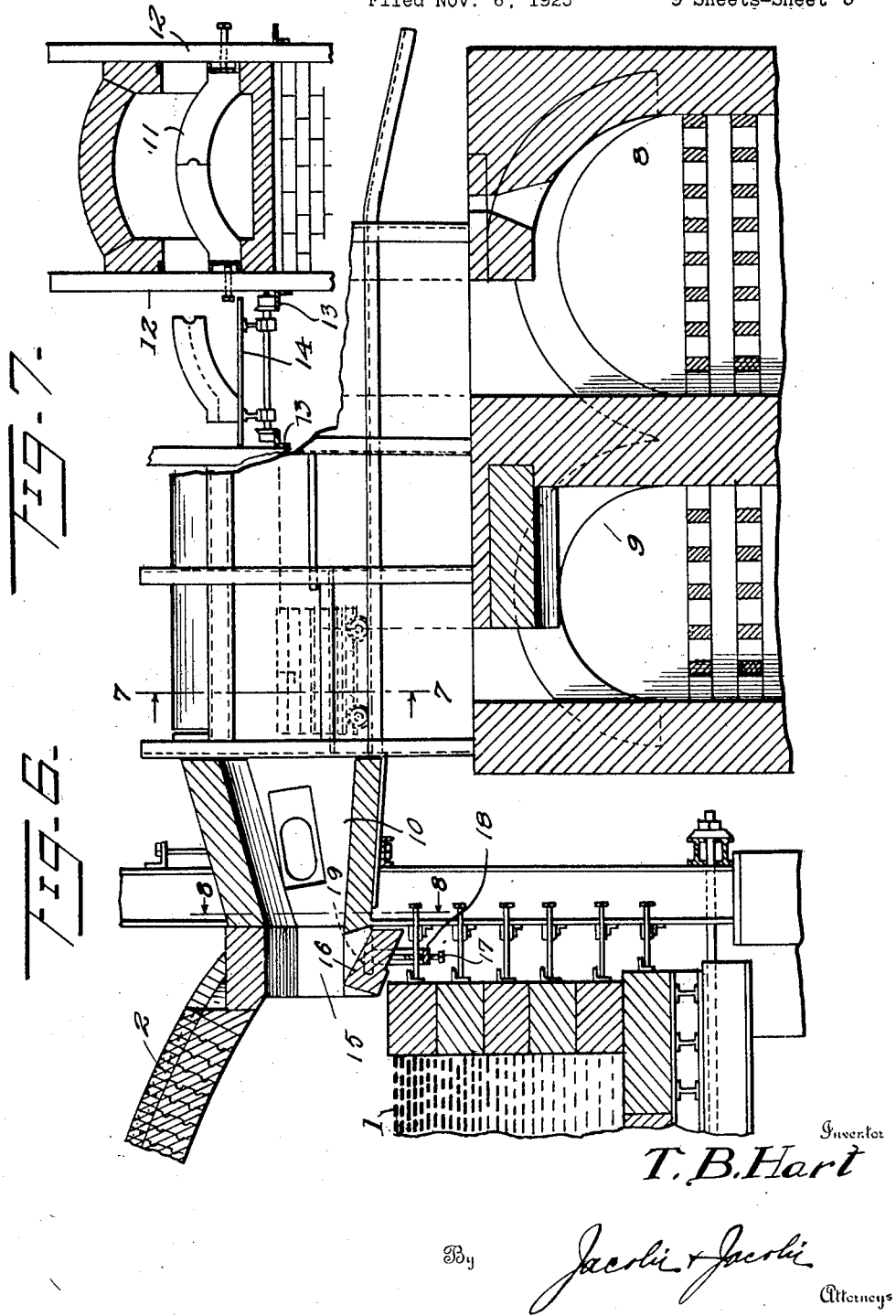

March 27, 1928.

T. B. HART

GLASS FURNACE

Filed Nov. 6, 1925

Inventor
T. B. Hart.
By Jacobi & Jacobi
Attorneys

March 27, 1928.
T. B. HART
GLASS FURNACE
Filed Nov. 6, 1925
1,663,839
9 Sheets-Sheet 5
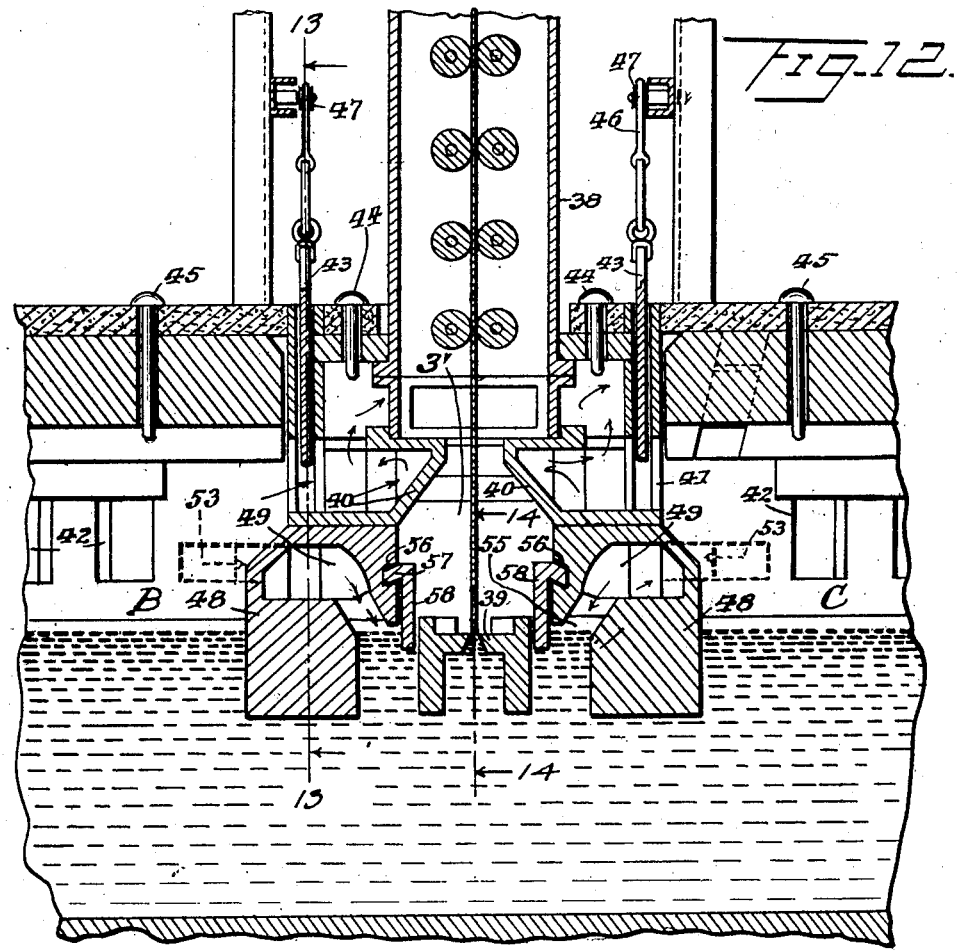
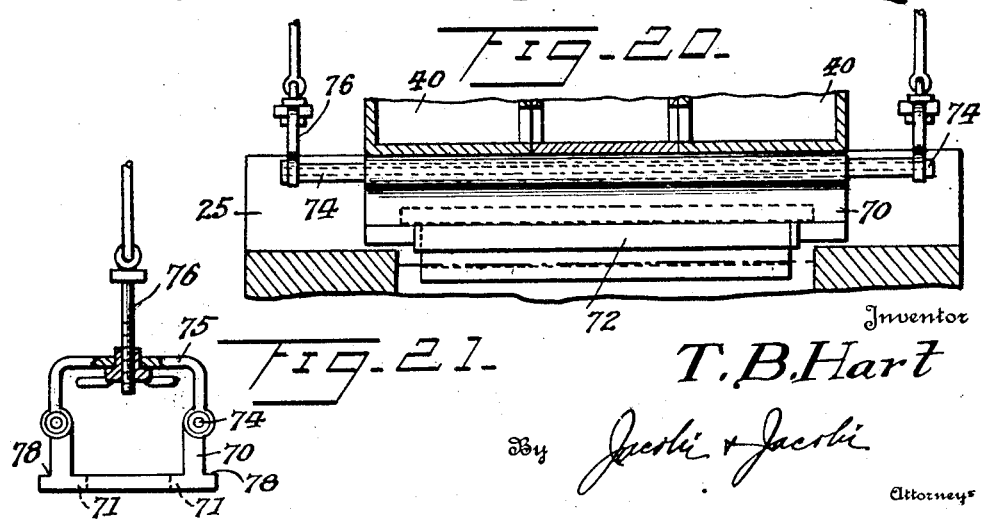
Inventor
T. B. Hart
By Jacobi + Jacobi
Attorneys March 27, 1928. 1,663,839
T. B. HART
GLASS FURNACE
Filed Nov. 6, 1925 9 Sheets-Sheet 6
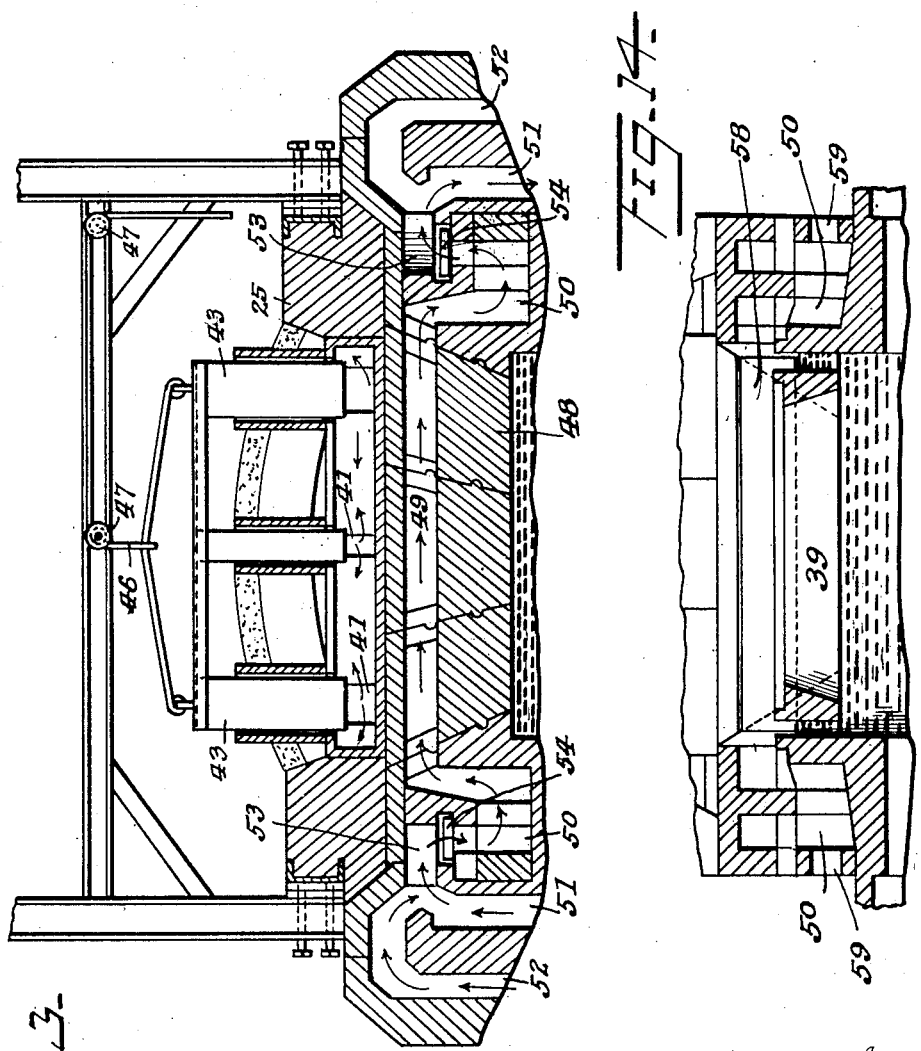
Inventor
T. B. Hart
By Jacobi & Jacobi
Attorneys March 27, 1928. 1,663,839

T. B. HART

GLASS FURNACE

Filed Nov. 6, 1925 9 Sheets-Sheet 7

Inventor
T. B. Hart
By Jaerli & Jaerli
Attorneys

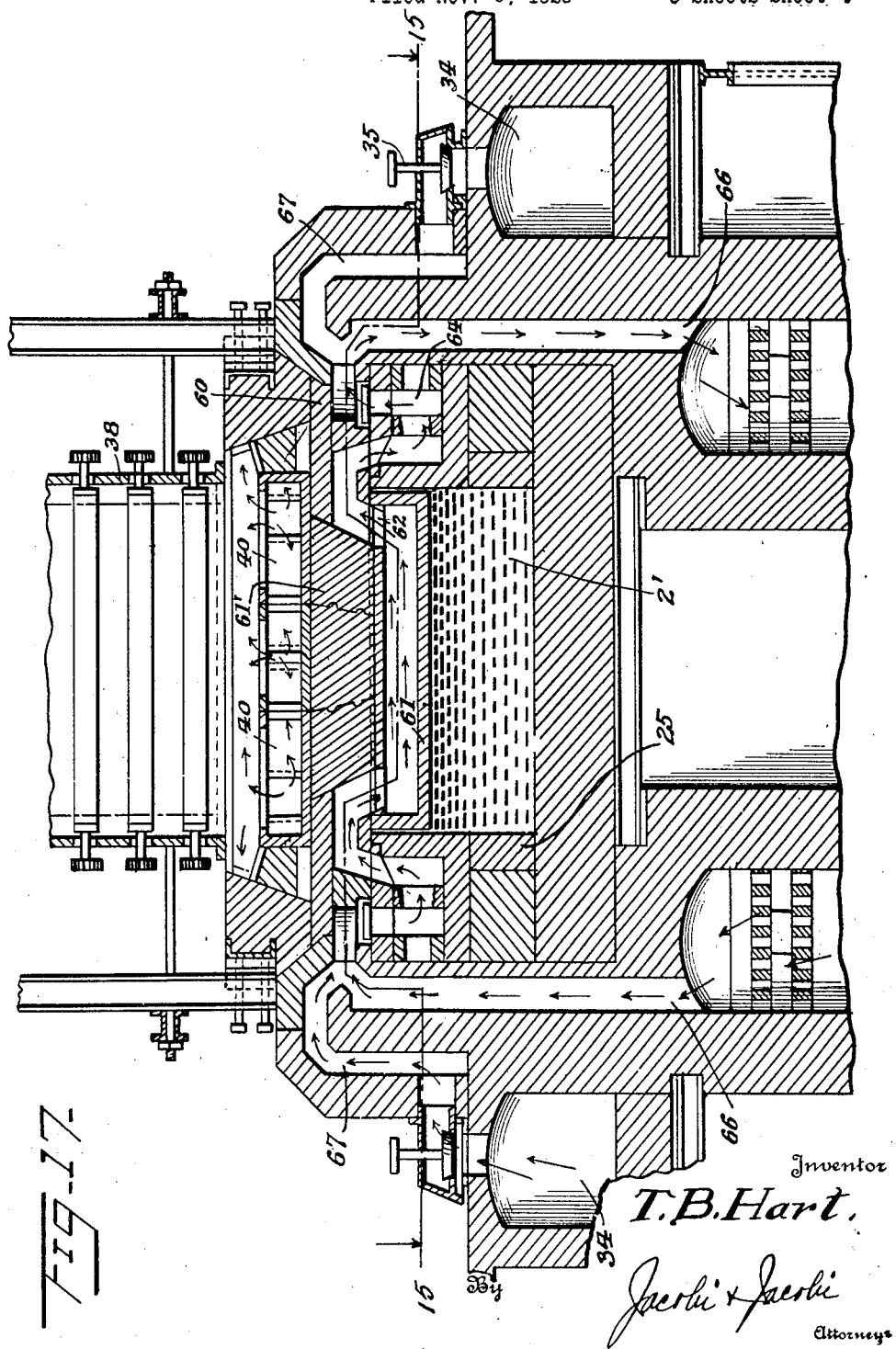

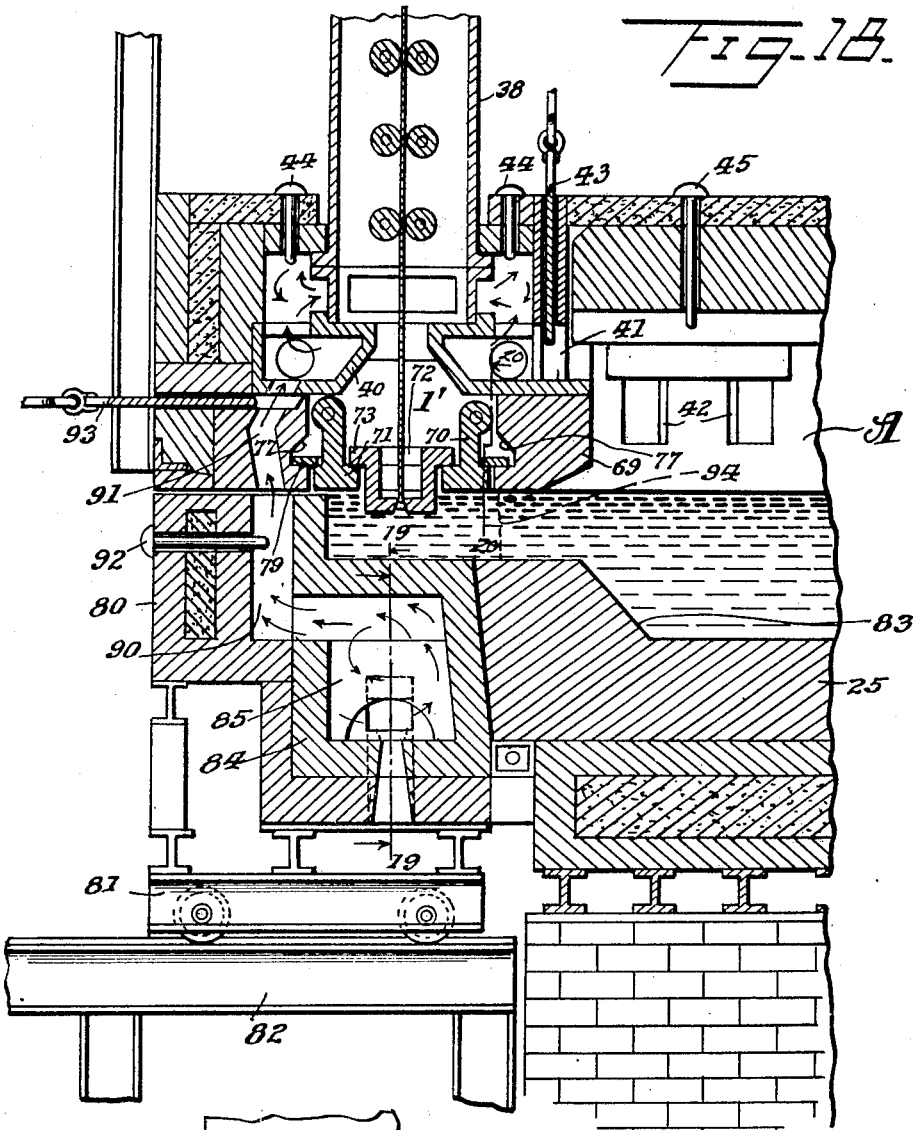
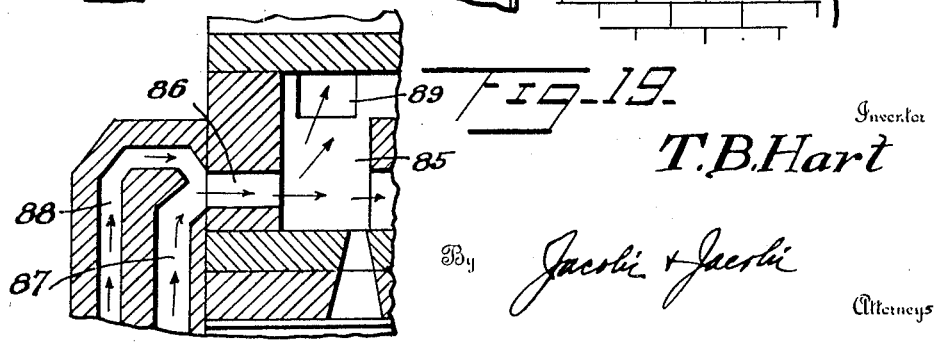

Patented Mar. 27, 1928.

1,663,839

UNITED STATES PATENT OFFICE.

THOMAS B. HART, OF LIBOW, WEST VIRGINIA, ASSIGNOR OF ONE-HALF TO BLACKFORD WINDOW GLASS COMPANY, OF VINCENNES, INDIANA, A CORPORATION.

GLASS FURNACE.

Application filed November 6, 1925. Serial No. 67,265.

This invention relates to new and useful improvements in glass furnaces, particularly of the type wherein molten glass of a homogeneous texture flows to a series of batteries of continuous sheet glass drawing machine.

The principal object of this invention is to provide an improved apparatus of this character whereby the molten glass when in position to be drawn through any of the drawing wells in the series of drawing machines will be of an absolute uniform and homogeneous texture, so that the resultant sheets of drawn glass will be of an even, uniform and homogeneous texture.

In previously known apparatus wherein batteries or series of drawing machines are used, the devices and methods used are not sufficient to overcome the difficulties encountered, to wit, the producing of uneven and unhomogeneous sheets of glass, due primarily to the fact that no means have been provided to overcome the differences in temperature of the molten glass of the various drawing chambers. It is a well known fact that as the molten glass flows from the melting furnace to the drawing chambers in a series of drawing machines, the temperature of the molten glass will be reduced proportionate to the distance from the melting furnace and, as stated, the present known apparatus for drawing glass has not provided for the raising of the temperature of the molten glass as it flows to the drawing chambers most distant from the melting furnace.

My improved apparatus overcomes these difficulties and is of a construction to heat or cool the molten glass as it flows from the melting furnace to the drawing wells, as the case may require and also provides for individually heating the molten glass in the respective drawing wells, the heat being applied in the proportions required to keep the glass at an even temperature throughout the series of wells and produce glass of a homogeneous texture.

Many manufacturers of glass, due to the conditions above referred to, use a small number of drawing machines in connection with their furnaces. Unless some apparatus is provided or means provided in connection with such apparatus to maintain the molten glass at an even temperature throughout the series of drawing chambers or drawing wells, sheet glass of an uneven texture will be produced. Inferior grades of glass will naturally be produced when the temperature of the molten glass is not uniform at the time of being drawn through the various drawing wells or drawing chambers. A better and uniform grade of glass will be produced by my improved apparatus.

A further object of my invention resides in the provision of an improved automatic skimming device between the melting furnace and the drawing furnace, the same being utilized to remove the scum and extraneous matter floating on the upper surface of the molten glass as the latter passes through the apparatus.

A still further object of the invention resides in the provision of an improved arch construction utilized in connection with the melting furnace to divide the air and gas passages leading to the mixing chamber.

Still another object of the invention resides in the provision of improved apparatus for moving sections of the aforesaid arch into position whereby the sections may be replaced quickly and readily while the furnace is in complete operation. Heretofore considerable difficulty has been encountered in the repair of arches of this type, for the reason that such arches have not been made in sections and no provision has been made for the removal or replacement of the same in hot condition but with my improved apparatus and construction, these sections of the arch may be removed or replaced while heated with little or no difficulty.

A still further object resides in the provision of an improved mixing chamber communicating with the combustion zone of the furnace through which flow the gases and air from the passages formed by the above referred to sectional arch.

A further object resides in the provision of an improved and removable plate block forming a floor at the mouth of the mixing chamber communicating with the combustion zone in the furnace.

Heretofore considerable difficulty has been encountered at the portions of the furnace wherein the mixing chamber communicates with the combustion zone. In order to make hot repairs, which are quite frequently necessary, it has heretofore been necessary to tear out the wall and a good portion of the mixing chamber and furnace. With my improved plate block construction, it is possible to remove the same quite readily and replace or repair it without disturbing any other construction than the plate block proper. This will not interfere with the operation of the furnace whatsoever.

Another very important object of my invention resides in the particular construction of the melting furnace and its crown or roof which together may be termed of a "Zeppelin" type, constructed to avoid the provision of corners and square portions or parts which ordinarily cause difficulties.

In prior constructions, known as the square type of furnaces, there is a reaction which takes place in the molten glass, due to the central portion of the furnace being the hottest. The flow of the molten glass of the central portion is more free to move toward the working end of the furnace, which causes the colder glass along the sides and corners to move in toward the center, thus causing a constant drag on the side walls. This causes fluxation and corrosion. With the type shown in my drawings, there are no corners nor square portions, the walls being curved or arcuate in design, preventing the molten glass at the ends or sides of the furnace from becoming unduly cold and the crown or top of the furnace is also arcuate in design so as to cause the heat to be reflected downwardly upon the molten glass, giving the maximum heating effect to the latter. Cold corners are eliminated in this particular construction and a more even temperature of the molten glass is maintained at all points throughout this melting furnace, creating an even flow therethrough and decreasing fluxations or corrosions along the walls at all points.

A still further object of the invention resides in providing a crown or roof for the melting furnace which is constructed of tongue and groove arch brick, the tongue and groove construction being set so as to eliminate fire from eating through the joints and burning or charring the heat conductive qualities of the insulation brick. This particular construction also eliminates dirt from sieving through the crown or top of the furnace into the molten glass, during the operation of the furnace.

A still further and important object of this invention resides in the provision of an improved annealing mechanism used in connection with each drawing well at the base of the drawing machine.

In prior constructions the process of annealing utilized produces a very hard and difficult glass to cut, which is primarily due to the drawing of the sheet through a cold well and coming in contact suddenly with a very hot annealing surface. In my improved construction I utilize wider or broader annealing surfaces, so constructed as to radiate the heat downwardly toward the base of the sheet of glass being drawn, thus bringing the temper gradually to the sheet. In this connection I also utilize an improved damper apparatus for controlling the heat passing to and from the annealing apparatus from the heating chambers.

With these and other objects in view, my invention consists in the novel features of construction, combination and arrrangement of parts as will be hereinafter referred to and more particularly pointed out in the specification and claims.

In the accompanying drawings forming a part of this application,

Figure 1 is a top plan view, with parts broken away and parts in section, showing my improved glass furnace in diagram.

Figure 2 is a fragmentary longitudinal section therethrough as seen on the line 2—2 of Figure 1.

Figure 3 is a vertical transverse section as seen on line 3—3 of Figure 1, showing particularly the automatic skimming device.

Figure 3ª is a detail vertical section as seen on line 3ª—3ª, of Figure 3.

Figure 4 is a fragmentary vertical section as seen on line 4—4 of Figure 1.

Figure 5 is a vertical section as seen on 5—5 of Figure 4.

Figure 6 is a fragmentary vertical section as seen on line 6—6 of Figure 1, part being broken away, and illustrating in particular the construction of the air and gas chambers, the mixing chamber and the removable plate block.

Figure 7 is a fragmentary vertical section as seen on line 7—7 of Figure 6, illustrating the positioning and construction of the sectional arch.

Figure 8 is a vertical section as seen on line 8—8 of Figure 6, illustrating particularly the construction of the plate block, and its mounting.

Figure 9 is a vertical transverse section as seen on line 9—9 of Figure 1, parts being broken away to illustrate particularly the relation between the automatic skimming device and the overflow spout.

Figure 10:
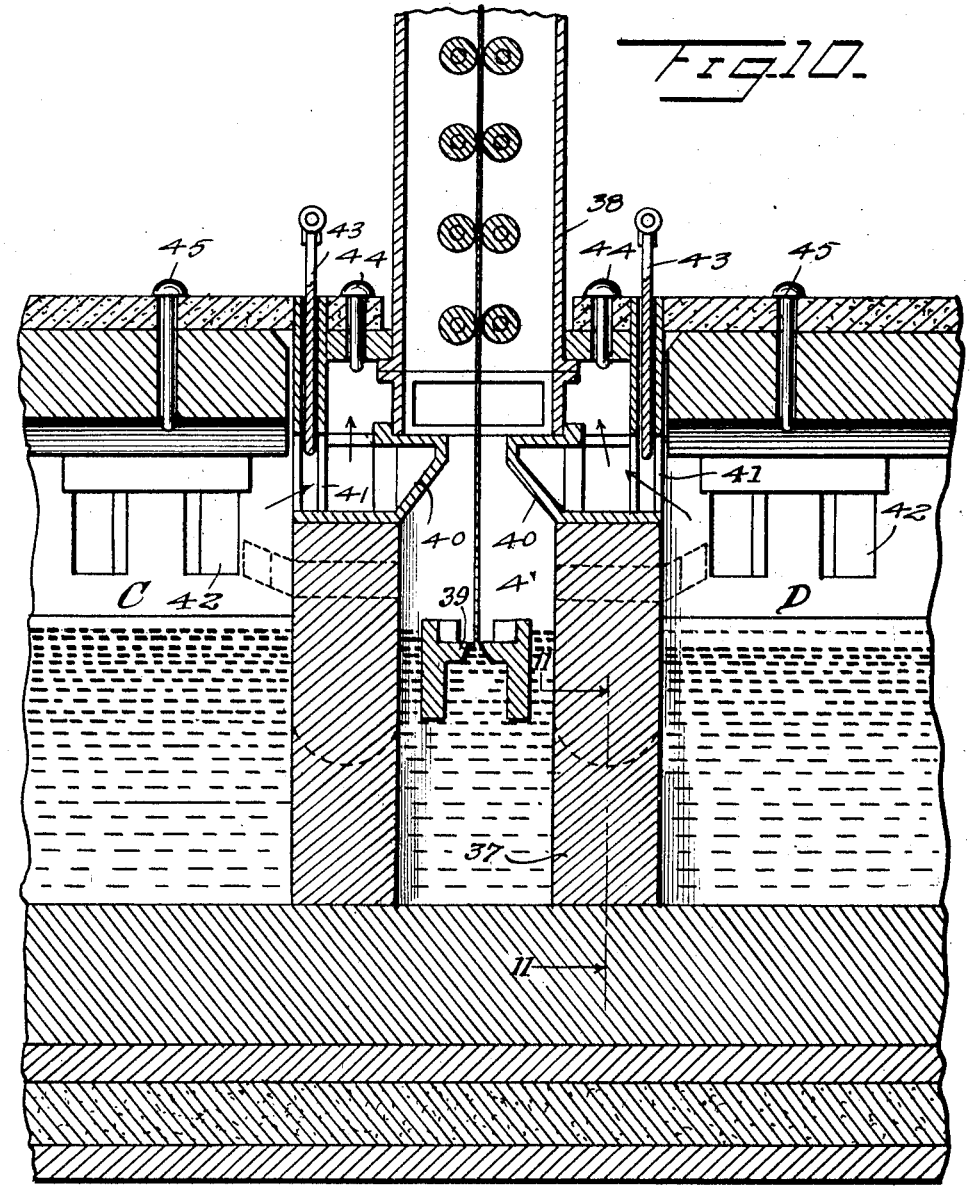

Figure 10 is an enlarged vertical section through the drawing well and the lower portion of the drawing machine most nearly adjacent to the melting furnace.

Figure 11:
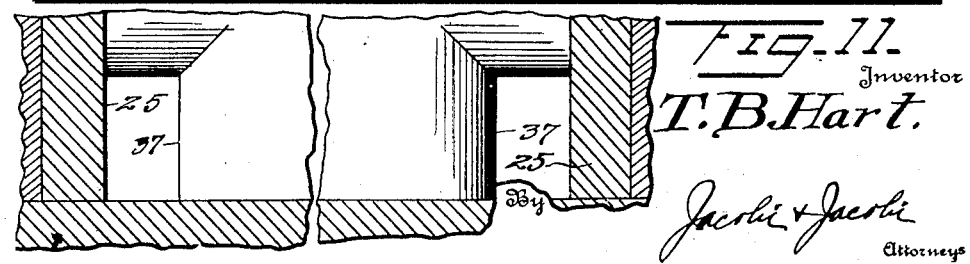

Figure 11 is a vertical section as seen on line 11—11 of Figure 10.

Figure 12 is a fragmentary vertical section through the drawing well and a portion of the drawing machine next adjacent to that illustrated in Figure 10, of the battery of wells forming one wing of the drawing tank.

Figure 13 is a vertical section as seen on line 13—13 of Figure 12.

Figure 14 is a similar view as seen on line 14—14 of Figure 12.

Figure 15:
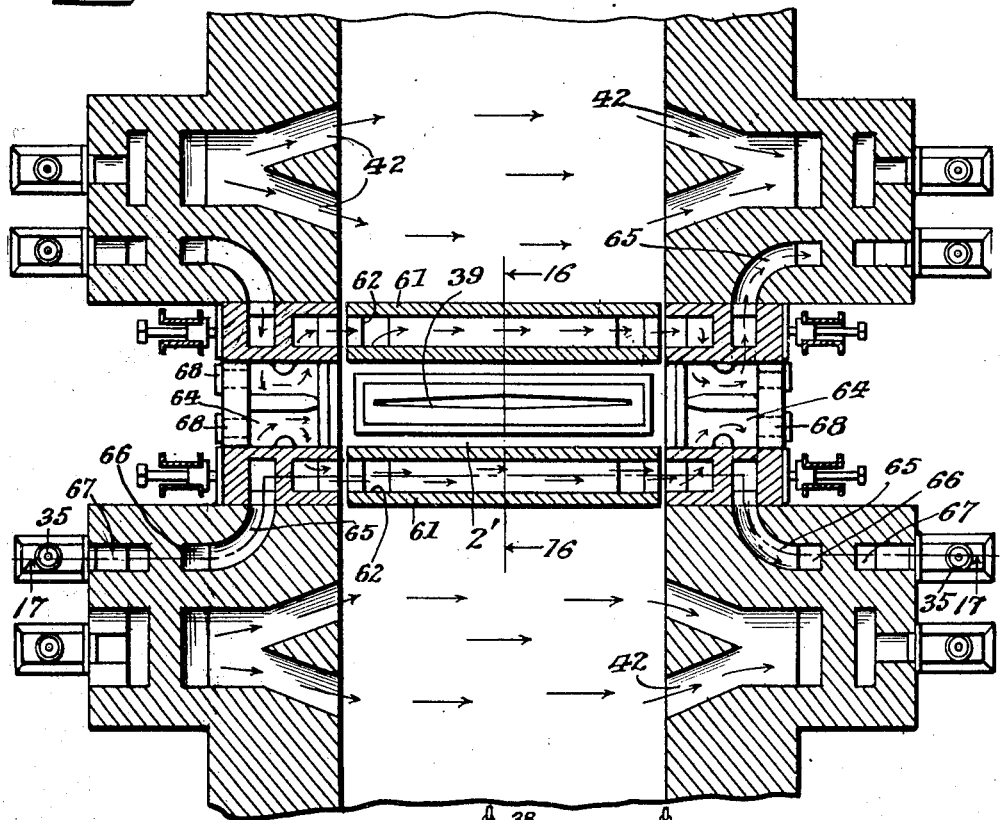

Figure 15 is an enlarged horizontal section taken through the drawing well next adjacent the one illustrated in Figure 12.

Figure 16:
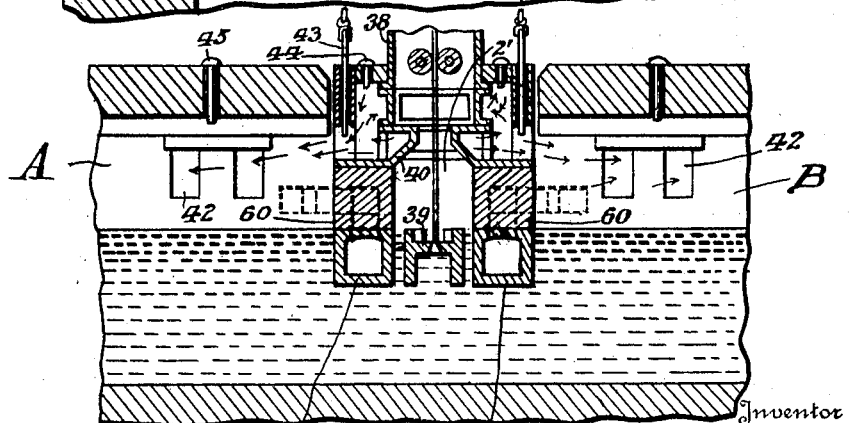

Figure 16 is a vertical section as seen on line 16—16 of Figure 15.

Figure 17 is a vertical transverse section as seen on line 17—17 of Figure 15.

Figure 18 is a vertical section through the outermost drawing well of the battery of wells forming one wing of the drawing tank.

Figure 19 is a fragmentary vertical section as seen on line 19—19 of Figure 18.

Figure 20 is a vertical section as seen on line 20—20 of Figure 18, and

Figure 21 is an end elevation with parts broken away and parts in section, of the suspension apparatus illustrated in Figure 20.

In describing the invention I will refer to the drawings in which similar reference characters designate corresponding parts throughout the several views and in which 1 designates the melting furnace which is designed in a manner to produce the maximum amount of heat. In carrying out this idea I prefer to design the same without any corners and, in other words, produce what I term a "Zeppelin" type of furnace, the end walls and crown of which are arcuate in design. Being so constructed, the molten glass in this furnace will be uniformly heated, in contra-distinction to the conditions which exist in connection with furnaces of the square type.

The numeral 2 designates the crown or top of the furnace 1 and, as clearly shown in Figure 2 and Figure 4 of the drawings is arcuate in cross section to reflect the heat downwardly upon the molten glass thereby giving the maximum heat to the material while the furnace is in operation. While the walls of the furnace 1 are generally of the usual or any preferred construction, the crown 2 is of an improved construction, as clearly shown in Figures 4 and 5 of the drawings.

As shown in Figures 4 and 5, the top or crown 2 of the furnace 1, is constructed of silica brick designated by the numeral 3 over which is applied a layer of heat conductive insulation brick designated by the numeral 4. The bricks 3 each are provided with central transverse grooves at the ends thereof and the faces are respectively provided with pairs of grooves and tongues, so that when these bricks are applied to form this crown 2, the bricks will be interlocked so as to provide substantially a pair of longitudinally interlocking tongues and grooves and a transverse central interlocking tongue and groove construction, as clearly illustrated in the Figures 4 and 5 referred to. This construction provides safety and durability in all types of arched crown furnaces, designed especially to eliminate fire from eating through the joints. Ordinarily the fire burning through the open joints acts upon the conductive insulation bricks to burn and char the same and thus remove the heat conductive qualities therefrom, but with my improved construction this condition will be obviated. This particular tongue and groove construction in connection with the top or crown of a furnace will also eliminate the admission or entrance to the furnace of dirt, dust, or other extraneous matter which has a tendency to seep through open joints, where insulation brick is not utilized. Hence this particular construction is very effective when applied to arched crowns where insulation brick is not used.

Mounted on opposite sides of the furnace 1 are the regenerator or checker chambers 5 which are of the usual or any preferred construction, to which lead the air and gas tunnels 6 and 7 respectively. Formed in connection with the checker chambers 5 are the usual air and gas chambers 6 and 7 which lead to the induction flues thereabove. Leading from the induction chamber is the mixing chamber 10, the mouth or port of which leads directly to the combustion zone of the furnace 1, as clearly shown in Figure 6 of the drawings.

The induction flues of the mixing chamber are divided by the arch 11 which is of an improved construction to be hereinafter more particularly described. This art of my improved device is preferably formed of four interlocking sections, the interlocking being accomplished by tongue and groove construction.

The super-structure above the checker chambers, a portion of which forms the induction chamber, is supported in place by vertical angle irons designated in the drawing by the numeral 12. Supported between several of these angle irons are the tracks 13, extending longitudinally of the checker chambers and some distance thereabove, upon which operate the movable cars 14. When it is desired to remove one or more sections of the arch 11 and replace the same while hot, it is only necessary to place a substitute section or sections upon the car 14, move the latter into position adjacent the arch and dispose the new arch section into its proper position by moving the same laterally of the car. The relation of the car and arch section to the arch proper is clearly illustrated in Figure 7 of the drawing. The relation of the car and track with respect to the furnace and checker chamber is clearly shown in Figure 6 of the drawings.

Ordinarily when it is necessary to repair or replace an arch, similar to the arch 11, in a furnace of this type, great difficulty is encountered due to the fact that the heat is intense and the lower portions of the masonry must be removed while a steel support is necessarily required while the arch is being rebuilt.

The mixing chamber 10 is of a construction new and novel in this particular art and will be described in detail. This chamber conducts the air and gases from the induction flues to the combustion zone of the furnace. As shown in the vertical section illustrated in Figure 6, this mixing chamber is constructed so that the bottom and top walls thereof diverge outwardly of the induction flues, considered on a vertical section and in horizontal section the walls of this chamber diverge outwardly toward the inner and adjacent the combustion zone. Otherwise described, the walls of the mixing chamber 10 are divergent in horizontal longitudinal section, and convergent in vertical longitudinal section in the direction of the furnace. As a result of this construction, the air and gas are thoroughly mixed in this chamber 10 and issue from the mouth 15 of said chamber to the combustion zone of the furnace where they are ignited. In issuing from the mouth 15, the air and gas are directed in a fan shaped jet which spreads over a greater area within the glass melting space and with a greater uniformity in heating the mass of molten glass.

Another important feature of my invention as stated in the objects heretofore presented is the removability of the plate block at the mouth of the mixing chamber. In the drawings this plate block is designated by the numeral 16 which is held in place by a plurality jack bolts 17 operating through a stirrup 18, the latter being suspended from the furnace wall supporting plate 19. The plate block 16 has its ends and rear edge beveled, as clearly shown in Figures 6 and 8 of the drawings and may obviously be moved into and out of position at the will of the operator of the furnace.

In ordinary furnace construction, this particular portion of the mouth of the mixing chamber is constructed stationary and as frequent repairs are necessary, known as "hot repairs", great difficulty is encountered in making such repairs and replacements when necessary. With my improved construction, repairs may be quickly and readily made with little effort during the operation of the furnace.

As the molten glass is acted upon by the heat in the melting furnace 1 it flows therefrom through a neck portion 20 to the cooling or refining chamber 21 which is of conventional construction, except that the same is also of the "Zeppelin" type, that is, arcuate in cross section to carry out the design above referred to in connection with the melting furnace 1. Disposed in the neck portion 20 is the floating skimmer 22, also of conventional construction and design whereby the upper surface of the molten glass may be removed through the opening 23 in the wall of the neck portion 20.

Leading from the cooling or refining chamber 21, is a neck portion 24 which affords communication between said chamber 21 and the drawing tank 25. Disposed within the neck portion 24 adjacent the entrance to the drawing tank 25, is provided an improved automatic skimming device represented generally by the numeral 26. This skimmer 26 is adapted to remove the material from the surface of the molten glass as it flows to the drawing tank 25 and being of an automatic character and new construction will be described in detail here below. The skimmer 26 may be described as being rectangular in cross section and hollow, the top wall thereof being provided adjacent the ends with the openings designated by the numeral 27. The skimmer 26 floats on the surface of the molten glass in the neck 24 and is submerged in said glass and the walls of the neck portion 24 just in advance of the skimmer 26 are provided with spouts 28 whereby the impurities skimmed from the surface of the molten glass may readily flow outwardly and automatically from the furnace, as clearly illustrated in Figure 9 of the drawings. I have also provided means for passing highly heated gases through this skimmer 26, whereby the intermediate stratas of the molten glass flowing through the neck 24 will be heated, causing the glass flowing therethrough at this point to have a more even temperature throughout the various stratas. Furthermore, the heating of the molten glass at this point gives energy to the flow of the glass and generally creates a temperature better adapted for the purposes to which the glass will be put when entering the drawing wells. The heating of the molten glass through the skimmer also gives energy to the flow of the scum impurities of the glass so as to remove the same quite readily, allowing the molten glass to flow freely through the neck to the drawing chambers. It is quite essential to remove the impurities at this point in an expeditious manner.

In providing a structure for the heating of the skimmer 26, I provide a suspended arch 29 which is mounted on the walls of the neck 24, the same being covered by the arched crown 30 which is also a portion of the arched crown for the drawing tank 25. The arch 29 is provided with an opening within which is disposed and from which is suspended the sectional block 31, the sections of which are interlocked as shown in Figure 3 of the drawings. The lower face of the block 31 is adapted to interlock through a tongue and groove construction with the upper face of the skimmer 26 such detail construction being fully illustrated in Figure 3ª of the drawings.

The suspended arch 29 is provided with radial firing ports 32 which lead to openings 33, the latter communicating with the openings 27 in the skimmer 26. The air chambers 34 on opposite sides of the walls forming the neck 24 afford means whereby gas may flow to the ports 32, valves 35 being provided for the control of such gas. Air conduits 36 are provided whereby the air may mix with the gas at a point in advance of the ports 32. It is obvious from this construction that the heated gases may be carried through the skimmer 26 and under control at all times.

Should it be found that the heating of the glass through this partially submerged skimmer brings said glass to a temperature too high for the desired purposes, the heated gases may be cut off and a curtain of cold air readily passed through the suspended skimmer thus evenly and effectively cooling the molten glass as the same flows under said submerged skimmer.

The molten glass passing from the neck 24 enters the drawing tank 25, which in my particular furnace is constructed of two wings designated by the numerals L and R respectively, representing left and right wings. Each wing of this drawing tank is provided with a series or battery of drawing wells operating respectively in connection with drawing machines of a conventional type. For convenience, I shall refer to the battery of wells illustrated in the left wing of the drawing tank, there being shown in my drawings four of such drawing wells designated respectively by the numerals 1', 2', 3' and 4'. Between each of the drawing wells just referred to, are the heating chambers A, B, C and D, respectively, the particular construction of which may be more readily observed in connection with the views showing in detail the construction of each well.

As stated in the objects of this invention, it is of extreme importance to maintain the molten glass at an even and uniform temperature throughout the various drawing operations in the various drawing wells. Were it possible to maintain this uniform temperature in a construction where a battery of wells is ordinarily used, the well construction throughout the battery would be the same or uniform, but it has been discovered that uniform temperature may not be maintained under such conditions and, therefore, a different well construction must be provided in each successive drawing well, so that heat may be supplied according to the requirement of the molten glass at the respective wells of drawing the glass. While in my apparatus the basic idea illustrated is more or less the same throughout the wells, the detail structure of each well is different, as will appear from the following detail construction.

For convenience, I shall first describe the well first encountered by the molten glass as it flows to the drawing tank. The specific construction of this particular well designated in Figure 1 as 4' is fully and clearly illustrated in Figures 10 and 11 of the drawings. The well 4' is formed primarily between a pair of spaced T-shaped bridge members 37, through which and between which the molten glass flows. To feed the molten glass to the sheet glass drawing machine 38 which is of a conventional type, I provide a float or "debiteuse" 39. This member 39 is of a conventional and well known construction used in glass furnaces of this type. As usual in constructions of this character, the molten glass is drawn through the float or "debiteuse" 39 to the rolls of the drawing machine 38. In prior construction and operation of an apparatus such as herein described, the process of annealing the finished product produces a very hard and difficult glass to cut. This is due primarily to drawing the sheets up through a cold well and coming in contact suddenly with a very hot narrow annealing surface. This causes a sudden tempering of the glass which in turn causes the glass to be hard. I have provided a construction which will broaden the annealing surfaces, thereby overcoming the difficulties aforementioned. In carrying out my ideas, I provide a series of hollow interconnecting members designated by the numeral 40, each series being mounted on the upper face of the bridge members 37. These members 40 provide what may be termed heaters therewithin which have communication with the adjacent heating chambers C and D, the communication being through the medium of the openings 41. The ports 42 admit the air and gases to the chambers C and D from whence the same may enter the openings 41 to the heaters. The heat radiating through the heaters obviously radiates through the wall of the members 40, thereby properly tempering the sheet glass as it is drawn from the well to the drawing machines. The amount of heat passing to the heaters is controlled through the actuation of the dampers 43 which operate vertically through the crown of said heaters.

In prior constructions of a like nature, it has been customary to utilize solid blocks through which the heat must radiate in order to properly anneal the drawn sheets of glass. In my improved construction, it is obvious that the heat may be placed in substantially direct contact with the drawn glass, thus tempering the glass gradually as it moves upwardly and thus producing glass of softer cutting qualities. Further it will be observed that this heat is in direct control of the operator at all times through the actuation of the dampers 43. Pyrometers 44 are mounted in the crown of the heaters whereby an accurate reading of thermal conditions may be obtained at all times. Additional pyrometers 45 are mounted in the crown of the tank whereby a reading of the condition of the heat chambers may be obtained when desired. The use of these pyrometers 44 and 45 are described in detail in connection with this particular well but it will be understood that these pyrometers are also used in connection with the apparatus in such successive well.

It has been found by experience that usually throughout the mass of molten glass in its flow from the melting furnace to the drawing tank, there is a frequent tremor, due to the reaction of the glass under the highly heated conditions in the melting end of the furnace. This condition causes distortion in the sheet of glass as it is drawn through the floater or "debiteuse". The bridge members 37 in my improved apparatus extend to the bottom of the tank 24 and in addition to supporting the heaters 40, also perform the function of baffles in the path of the flowing glass, causing the latter to flow to and through opposite sides of the central portion of said bridge members. This obstruction breaks the continuity of flow of the molten glass, preventing effects of said tremor upon the drawn glass and correspondingly eliminating distortion.

As the molten glass flows from the drawing well 4' it enters the portion of the tank below the heating chamber C from whence it flows in to the well 3'. The heating chamber C is of the same construction as the previously described chamber, being provided with the firing ports 42. The gases from the chamber C and from the chamber B enter the heaters in this well, which are constructed in a manner similar to the heaters described in connection with the well 4', the entrance being through the openings 41, this radiant heat being controlled by the dampers 43, which in this well are of the same construction as illustrated in the well 4'. As shown clearly in Figures 12 and 13, these dampers 43 are controlled from any distant point through the medium of cables 46 operating over pulleys 47. A "debiteuse" 39 floats in the glass in this well 3' in the same manner as described in connection with the well 4' through which the molten glass is drawn to the drawing machine 38.

It is broadly known in this art from experience with the existing machines wherein batteries of wells are used that the first well encountered by the molten glass in the drawing tank will produce sheet glass of a higher quality than the succeeding wells or machines. This is due to the fact that the first well receives the freshly molten glass in its highest consistency of homogeneous texture. Hence the application of highly heated gases in close relation to the well is not required at this point. However, it is a known fact that the molten glass in passing through the first well on to the remaining wells of the battery depreciates in its consistency of homogeneous texture. Hence it is desirable to provide at the second well engaged some heating means to obviate this depreciated condition and revive the molten glass to its same state of consistency as it enters the first well. I have therefore, in connection with the well 3' provided means for applying heated gases in direct communication with the surface of the glass and on both sides of the "debiteuse" in a mild form, as may be required at these points.

In carrying out this idea, I provide a pair of suspended arches 48 which are each constructed of a series of interlocking sections, which is clearly illustrated in Figure 13 of the drawing. These arches are suspended from the walls of the tank 25 as also clearly shown in Figure 13 and are partially submerged in the molten glass, as more clearly disclosed in Figure 12 of the drawing. These arches 48, disposed on opposite sides of the "debiteuse" 39 are each provided with longitudinal passageways 49 which communicate with the fire boxes 50 mounted, supported on or otherwise connected with the side walls of the tank 25. These fire boxes 50 receive the air and gas, respectively, from the conduits 51 and 52, the air and gas being mixed in a chamber 53 and the flow of mixed air and gas to the fire boxes being controlled by dampers 54. Each arch 48 is provided with a downwardly and inwardly inclined slot or passageway 55 communicating with the conduit or passageway 49 thereof so that the heated gases passing through the latter may be directed downwardly to the surface of the molten glass on opposite sides of the "debiteuse," as clearly illustrated in Figure 12 of the drawings.

The inner opposed faces of the suspended arches are provided with inclined slots 56 which are adapted to receive snugly therein the inclined upper edge flanges 57 of the aprons 58, which aprons suspend below the adjacent faces of the arches and have their lower edges submerged below the surface line of the flowing mass of molten glass, clearly shown in Figure 12. These aprons 58 prevent the heated gases which are directed to the surface of the molten glass through the slot 56 from entering the well 3', thus preventing distortion from appearing in the drawn glass, which would ordinarily be true were these ignited gases directed to the glass in the wells.

The fire box 50 are provided with imperforate walls of a very durable construction and the possibility of molten glass entering the same is entirely eliminated. Through the medium of these fire boxes directing heat through the passages of the suspended arches and directly to the surface of the molten glass, the consistency of the glass is revived to the proper degree and maintained at all times in a homogeneous condition as it is being drawn by the sheet into the "debiteuse".

Should at any time for no reason whatsoever, the temperature become too great in the drawing well through the method just described, I have made provision wherein cold air may be taken through the same passages as receive the hot gases. This may be accomplished by eliminating the hot gases and opening the cold air vents 59, shown in Fig. 14. Thus, it will be seen, I have provided means for either heating or cooling the glass in the well, at the will of the operator and under absolute and separate control at all times.

The next succeeding well encountered by the molten glass as it flows from the well 3' is well 2' disposed between the heating chambers A and B. Such a well under ordinary conditions, it is well known, presents a further problem with which the operator must deal due to a still further depreciation in the consistency of homogeneous texture of molten glass. The molten glass loses its high temperature as it flows further from the melting furnace, of course, but even in my improved apparatus where additional means is provided for heating the molten glass at each well, a condition exists whereby a special heating apparatus must be provided at this particular well.

It is a known fact in this art that after the glass has passed from the melting furnace, the successive heating of the same by the application of heated gases upon the surface of the glass is quite destructive to the working consistency and also to the finished product. My improved apparatus, in its application to the previously described wells and also the wells to be next described, avoids the necessity of using an excessive heat applied directly to the surface of the molten glass, it being my idea to provide a construction whereby highly heated gases may be constantly and evenly distributed to the surface of the glass and to some of the lower stratas thereof in each well through the medium of radiant heat. Were it not possible to properly heat the glass in the wells in a manner which I have previously described and which I will describe in connection with the remaining forms of heating apparatus, it would be necessary in order to bring the molten glass to the proper consistency, to use excessive heat in the heat chambers A, B, C and D to the surface of the glass, which as stated above, would be detrimental to the consistency thereof and result in a poorer grade of drawn glass.

Referring now particularly to Figures 15, 16 and 17 in which is particularly disclosed the construction of the apparatus used in well 2', it will be understood that the heat chambers, annealing apparatus, control dampers, "debiteuse" and drawing machine are all of the same character as previously described and disclosed in connection with the above referred to wells, so that further description of the same appears unnecessary at this time.

In this well construction I provide a pair of suspended arch members 60 which may be said generally to be of a similar construction to the suspended arch illustrated in Figure 3 and described in connection with the automatic skimming device shown therein. This arch has mounted centrally therein a block 61' formed of sections interlocking one with the other, as clearly shown in Figure 17, the lower face of which interlocks through a tongue and groove construction with the upper face of a hollow rectangular conduit member of box-like design. The upper face of this conduit which is designated by the numeral 61 is provided adjacent its ends with openings 62 which communicate with the gas passages 63 extending longitudinally through the arch 60.

From this description and the illustration in Figures 16 and 17, it will be seen that I have provided a method of not only heating the surface of the molten glass in this particular well but also a means of heating the lower strata or stratas of said glass at this point which will tend to bring the glass to a consistency and temperature equal to that of the next preceding well, whereby the resultant glass will be of a quality equal to that produced by the preceding drawing machines. Figure 17 clearly illustrates the circulation of the heated air and gases through the firing chambers and through the suspended arch and submerged conduits, the arrows in this figure illustrating the course of the heated air and gases. Obviously, the above stated results will be accomplished through the application of the heat in this manner when the furnace is in operation.

Should it be found that the circulation of the heated air and gases in the manner described above brings the temperature of the molten glass to a degree higher than that desired I have provided for the circulation of cold air through the passages by providing the direct cold air ports 68 in the outer walls of the firing chamber 64, it being understood, of course, that when these air vents 68 are placed in use, the circulation of the heated air and gases will be cut off. Thus it will be seen from this construction that either the circulation of heated air and gases or the circulation of cool air may be controlled at the will of the operator.

The molten glass flowing through the tank 25 leaves the well 2' and enters the portion of the tank below the heating chamber A from whence it flows to the final or last well in the battery designated in the drawings as 1'. At this particular well in a battery of wells, a condition exists which must be dealt with differently than with the preceding wells due to the conditions existing. The molten glass, under ordinary conditions in a battery of wells, reaches the final well in a more or less poor condition, having been thrown off from the various preceding wells and being of a materially lower temperature and less homogeneous texture. If no special heating apparatus is used for this last well, a glass will be produced which is of a poor quality, known in the glass world as "green house" quality. In many instances where a battery of wells is used, the molten glass drawn from the last machine will be of an absolute loss, due to the poor quality resulting from the poor quality of molten glass. Inability to revive the lower stratas of the molten glass to the consistency of the top strata is usually the cause for the poor quality of glass. In the following description of the well construction 1' it will be seen that I have provided a device to overcome the difficulties previously encountered and above mentioned.

In this form of well I provide a pair of suspended arches 69, which support the annealing chambers which are similar in construction to the previously described annealing chambers in the other wells, the same operating in connection with the drawing machine 38 of the conventional type. The heat radiating from the chamber A is adapted to enter the adjacent annealing chamber through the ports 41, controlled by the dampers 43. Suspended within the space between the two arches 69 is a rectangular-shaped supporting rack member 70 formed of clay and having side walls thereon. The lower edges of said walls of this rack member are provided with inwardly extending opposed flanges 71 which are adapted to support the "debiteuse" hereinafter described. This "debiteuse" is indicated by the reference numeral 72 and is of hollow box-like design having its upper side edges provided with outstanding flanges 73 which flanges are adapted to rest upon the flanges 71 of the rack member 70. Thus the "debiteuse" is suspended in the well within the molten glass, the lower portion of said "debiteuse" being submerged within said molten glass, as appears obvious from the construction illustrated in Figure 18 of the drawings.

The upper ends of the side walls of the rack 70 are provided with bearings through which extend the hollow air cooled shafts 74 upon which are mounted the ends of the yolked 75 which receives centrally therein the adjustable ends of suspension members 76, the latter being suspended in control from any distant point (not shown).

The inner opposed faces of the arches 69 are grooved longitudinally as shown by the numeral 77 and the outer faces of the side walls of the member 70 are projected outwardly at their lower ends to form shoulders 78 which shoulders are in horizontal alinement with the lower walls of the grooves 77, as clearly shown in Figure 18. Upon these shoulders 78 and lower walls of the grooves 77 rest the covering plates 79. These covering plates 79 prevent the escape into the well proper of any ignited gases.

As stated previously the molten glass exposed to the last well is ordinarily of a poor quality, particularly the lower strata of this glass. In order to overcome the difficulty I desire to provide an improved end wall construction for the tank 25 which will prevent the lower stratas of molten glass from flowing directly to the well 1'. To this end, I desire to provide a portable end wall section which I designate generally by the numeral 80, the same being movable into position on a car 81 mounted on tracks 82 at the outer end of the tank 25, shown clearly in Figure 18. The bottom wall of the tank 25 is cut off at a point just below the well 1' and the end thereof is increased in thickness and beveled as shown by the numeral 83 which forms a bank gainst which the lower stratas of the molten glass must strike and over which the same must flow, before entering the well 1'. Thus it will be seen that the lower stratas of the molten glass may not readily enter well 1' but before so entering will become heated to the required temperature.

The portable end wall 80 is substantially L-shaped in vertical section and supports thereon a housing 84 which is designed to form a heat chamber 85 air and gases entering the same from opposite ends through the ports 86, the air being admitted from the conduits 87 and the gas from the conduits 88, as shown in Figure 19. The air and gases from the chamber 85 are radiated through the opening 89 to a passageway 90 between the end wall 80 and the housing 84 from whence the heated gases are admitted to the outer end annealing chambers through a passageway 91 formed in the outer end suspended arch, as clearly shown in Figure 18.

It will be seen from this construction that in the positioning of the chambers 85 in vertical alinement with the well 1' below the latter, radiant heat from said chamber will highly heat the molten mass of glass in the well prior to being drawn, thus accomplishing the desired results. Further it will be seen that as the radiant heat flows from the chamber 85 it passes through the passageways 90 and 91, thus thoroughly heating the end wall of the tank 25 which is quite essential and important in a device of this character. Due ordinarily to the fact that the end wall becomes cooled and ordinarily no heating means is provided for this wall, great difficulty has been encountered with the end drawing well. This particular construction will overcome this difficulty. This member 84 which forms a chamber 85 is constructed with imperforate walls so that the molten mass under no condition will leak therethrough.

In order to obtain a reading of the temperature within the passageway 90 I provide the horizontally disposed pyrometers 92 and in order to control the flow of radiant heat through the passageway 91 to the outer end annealing chambers, I further provide the horizontally operating dampers 93 which are of the same construction and controlled in the same manner as the dampers described and shown in connection with the previously referred to wells.

From the particular construction of the well and bottom of the tank 25, it will be seen that I have provided a means whereby only the top and intermediate stratas of the molten glass flowing to this well will be drawn. It will further be seen that the construction of the mounting for the "debiteuse" or drawing block is such as will allow this "debiteuse" to be submerged vertically in the molten glass.

This allows the glass to be drawn from near the surface, known as the easiest glass to maintain in a consistency of homogeneous texture, particularly at this last end well of the battery. It will further be seen that in this particular well construction I have provided means for applying the highly heated gases through and under the molten glass, affording an effective radiant heat, evenly distributed throughout the base of the drawing well and annealing chambers. This is sufficient to maintain at all times a homogeneous working condition of the glass and the heat is under control of the operator at all times.

It will still further be seen that the portability of the end wall construction permits quick and easy changes or repairs to be made at this end of the tank, the same being accomplished by damming temporarily the tank 25 at a point slightly in advance of this well 1', indicated in Figure 18 by the dotted line 94. While such changes and repairs at this part of the apparatus may not be frequent, I have provided construction whereby the same may be accomplished without disturbing the operation of the furnace.

In prior construction using a battery of wells, frequent intermissions in operation are due to the molten glass firmly congealing at the sides and ends of the drawing blocks or "debiteuse", which destroys the commercial value of the finished product. The application of the highly heated gases in the manner described and shown in connection with my device, eliminates the possibilities and probabilities of said intermissions.

It is further to be seen that I have provided herein a combination of various drawing wells and annealing chambers that will properly function in their duties, meeting the various requirements and conditions that actually exist in a drawing furnace of this type. Thus eliminating frequent intermissions in operating, retaining the heating, cooling and annealing conditions under such absolute control at all times, I make it possible through my improved apparatus to produce glass of a homogeneous texture and uniform quality throughout all drawing machines alike.

It will be seen that the construction of my improved furnace is such that either natural or manufactured gases may be used in the heating thereof, so that glass manufacturers in all localities may readily install such a furnace without consideration of change of locality to obtain the benefit of natural resources.

From the foregoing description of the construction of my improved apparatus, the operation thereof will be readily understood and it will be seen that I have provided a simple, comparatively inexpensive and efficient means for carrying out the numerous objects of the invention.

While I have particularly described the elements best adapted to perform the various functions set forth, it is obvious that various changes in form, proportion and in the minor details of construction may be resorted to, without departing from the spirit or sacrificing any of the principles of the invention.

Having thus described my invention, what I claim is:

1. In a glass furnace, a melting furnace, a drawing tank in communication therewith divided into a series of alternating reheating chambers and drawing wells and a separate and distinct heating means for each of said wells constructed to supply heat thereto proportionate to the depreciation of the glass flowing through the tank, to retain said glass in a uniform texture throughout the various wells in the process of drawing.

2. In a glass furnace, a melting furnace, a drawing tank in communication therewith divided into a series of alternating reheating chambers and drawing wells, a separate heating means for each of said wells constructed to supply heat thereto proportionate to the depreciation of the glass flowing through the tank, retaining said glass throughout in a uniform texture, and means in connection with the respective heating means of each well to control the flow of heat thereto.

3. In a glass furnace, a melting furnace, a drawing tank in communication therewith divided into a series of alternating reheating chambers and drawing wells, means for supplying heat to each of said wells in increasing amounts proportionate to the depreciation of the glass as it flows toward the outer end of said tank and additional means for controlling independently the flow of heat to each of said wells.

4. In a glass furnace, a melting furnace, a drawing tank in communication therewith divided into a series of alternating reheating chambers and drawing wells, means for supplying heat to each of said wells in increasing amounts proportionate to the depreciation of the glass at it flows toward the outer end of said tank, the heating means for the outermost well of said series also acting as a heating means for the outer end wall of said tank.

5. In a glass furnace, a melting furnace, a drawing tank in communication therewith divided into a series of alternating reheating chambers and drawing wells, separate means for supplying heat to each of said wells in increasing amounts proportionate to the depreciation of the glass as it flows toward the outer end of said tank, the heating means for the outermost well of each series also acting as a heating means for the outer end wall of said tank and additional means for controlling independently the flow of heat to each of said wells.

6. In a glass furnace, a melting furnace, a drawing tank in communication therewith divided into a series of alternating reheating chambers and drawing wells, separate means for supplying heat to each of said wells in increasing amounts proportionate to the depreciation of the glass as it flows toward the outer end of said tank, certain of the heating means of said wells directing heat to the surface of the glass in said tank and certain others directing heat to and below the surface of said glass.

7. In a glass furnace, a melting furnace, a drawing tank in communication therewith divided into a series of alternating reheating chambers and drawing wells, separate means for supplying heat to each of said wells in increasing amounts proportionate to the depreciation of the glass as it flows toward the outer end of said tank, certain of said heating means for said wells directing radiant heat to the surface of the glass in said tank, certain heating means directing its radiant heat to and below the surface of said glass and certain other heating means disposing its fire directly to the surface of said glass, whereby the glass is retained in a uniform texture throughout the various wells in the process of drawing.

8. In a glass furnace, a drawing tank consisting of a series of alternating reheating chambers and drawing wells and a plurality of hollow heaters in connection with each well adapted to receive radiant heat from said reheating chambers.

9. In a glass furnace, a drawing tank consisting of a series of alternating reheating chambers and drawing wells, a plurality of hollow heaters in connection with each well adapted to receive radiant heat from said reheating chambers, and means for controlling the flow of heat to said heaters.

10. In a glass furnace, a drawing tank consisting of a series of alternating reheating chambers and drawing wells, a plurality of heaters in connection with each well adapted to receive radiant heat from said reheating chambers, and dampers operating between said reheating chambers and heaters to control the flow of heat to the latter.

11. In a glass furnace, a drawing tank consisting of a series of alternating reheating chambers and drawing wells, and a plurality of hollow members supported in the sides of each well and providing annealing chambers having communication with the aforesaid reheating chambers.

12. In a glass furnace, a drawing tank consisting of a series of alternating reheating chambers and drawing wells, a plurality of hollow members supported in the sides of each well and providing annealing chambers having communication with the aforesaid reheating chambers and dampers operating between said reheating and annealing chambers to control the flow of radiant heat to the latter.

13. In a glass furnace, a drawing tank, a well formed therein and central baffles mounted on the floor of said tank and extending upwardly on opposite sides of said well, as and for the purposes described.

14. In a glass furnace, a drawing tank, a well formed therein and T-shaped baffles mounted on the floor of said tank and extending upwardly on opposite sides of said well, as and for the purposes described.

15. In a glass furnace, a drawing tank, a well formed therein, said tank being constructed with reheating chambers on opposite sides of said well, baffles mounted on the floor of said tank and extending upwardly on opposite sides of said well, and heaters mounted on the upper faces of said baffles having communication with the aforesaid reheating chambers.

16. In a glass furnace, a drawing tank, a well formed therein, a drawing block in said well, a pair of suspended arches within said tank on opposite sides of said well, said arches being formed with longitudinal and laterally disposed heat passages, whereby to direct fire to the glass within said tank on opposite sides of said drawing block, and means for supplying heat to said passages.

17. In a glass furnace, a drawing tank, a well formed therein, a drawing block in said well, a pair of suspended arches within said tank on opposite sides of said well, said arches being provided with longitudinal heat passages therein and also provided with downwardly inclined slots communicating with said passages to direct fire to the surface of the glass in said tank on opposite sides of said drawing block, means for supplying heat to said passages and removable aprons suspended from the inner opposed faces of said arches on opposite sides of said drawing block, as and for the purposes described.

18. In a glass furnace, a drawing tank, a well formed therein, a drawing block in said well, a pair of suspended arches within said tank on opposite sides of said well, said arches being provided with longitudinal heat passages therein and also provided with downwardly inclined slots communicating with said passages to direct fire to the surface of the glass in said tank on opposite sides of said drawing block, the inner opposed faces of said arches being formed with longitudinal and inwardly inclined grooves, means for supplying heat to said passages and aprons having angularly formed flanges at the upper edges thereof receivable removably in the aforesaid grooves of said arches, whereby to suspend said aprons on opposite sides of the drawing block, as and for the purposes described.

19. In a glass furnace, a drawing well, suspended arches on opposite sides of said well, a drawing block therebetween, and means cooperating with said arches for radiating heat to and below the surface of the glass within said tank on opposite sides of said drawing block.

20. In a glass furnace, a drawing well, suspended arches on opposite sides of said well, a drawing block therebetween, means for supplying heat to said arches, and conduits below said arches communicating with the latter on opposite sides of the drawing block to heat the upper and lower stratas of glass flowing into said wells.

21. In a glass furnace, a drawing well, suspended arches on opposite sides of said well, a drawing block therebetween, means for supplying heat to said arches, and floating conduits in communication with said arches to receive heat from the latter on opposite sides of the drawing block and correspondingly radiate the same to and below the surface of the glass in said well.

22. In a glass furnace, a drawing well, suspended arches having heat passages formed therein, means for supplying heated gases to said passages, a drawing block positioned between said arches, submerged conduits below said arches and having communication with the passageways of the latter to radiate heat to the surface and below the surface of the glass in said well.

23. In a glass furnace, a drawing well, suspended arches having heat passages formed therein, means for supplying heated gases to said passages, a drawing block positioned between said arches, submerged conduits removably engaged with the lower faces of said arches, said conduits having communication with the passages of said arches to radiate heat to and below the surface of the glass in said well.

24. In a glass furnace, a drawing well, suspended arches having heat passages formed therein, means for supplying heated gases to said passages, a drawing block positioned between said arches, submerged conduits removably engaged with the lower faces of said arches, said conduits having communication with the passages of said arches to radiate heat to and below the surface of the glass in said well, hollow members mounted on said arches forming annealing chambers for tempering the drawn glass and means for supplying heated gases to said chambers.

25. In a glass furnace, a drawing tank, a well formed therein, a suspended supporting rack within said well and a drawing block removably suspended from said rack.

26. In a glass furnace, a drawing tank, a well formed therein, a rack suspended within said well having side walls and lateral flanges formed at the lower edges thereof, a drawing block having lateral flanges resting on the flanges of said rack to suspend said block in said well, as and for the purposes described.

27. In a glass furnace, a drawing tank, a well formed therein, suspended arches on opposite sides of said well, a rack suspended within said well between said arches and a drawing block removably suspended from said rack.

28. In a glass furnace, a drawing tank, a well formed therein, a pair of suspended arches on opposite sides of said well, the inner opposed faces of said arches being formed with longitudinal grooves, a rack suspended within said well between said arches, the outer faces of said rack being formed with shoulders in horizontal alinement with the base walls of said grooves, covering plates resting on said base walls and shoulders, and a drawing block suspended from said rack, as and for the purposes described.

29. In a glass furnace, a drawing tank, a well formed therein, and a heating chamber removably mounted in connection with said tank adapted to form a partial bottom and partial end wall for said tank.

30. In a glass furnace, a drawing tank, a well formed therein, a heating chamber removably mounted in connection with one end of said tank to form a partial bottom and partial end wall therefor, and means in connection with said chamber for radiating the heat from the latter to said well, as and for the purposes described.

31. In a glass furnace of the class described, a drawing tank, a well formed therein including walls, reheating chambers therefor and heaters carried in the walls of said drawing well having communication with said reheating chambers.

In testimony whereof I affix my signature.

THOMAS B. HART.